United States Patent
Jung

(10) Patent No.: US 9,202,287 B2
(45) Date of Patent: Dec. 1, 2015

(54) APPARATUS AND METHOD FOR PROCESSING COLOR IMAGE USING DEPTH IMAGE

(71) Applicant: SAMSUNG ELECTRONICS CO., LTD., Suwon-si (KR)

(72) Inventor: Seung Won Jung, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 242 days.

(21) Appl. No.: 14/033,848

(22) Filed: Sep. 23, 2013

(65) Prior Publication Data

US 2014/0140613 A1 May 22, 2014

(30) Foreign Application Priority Data

Nov. 22, 2012 (KR) .......................... 10-2012-0132917

(51) Int. Cl.
*G06K 9/40* (2006.01)
*G06T 7/40* (2006.01)
*G06T 7/00* (2006.01)

(52) U.S. Cl.
CPC ............... *G06T 7/408* (2013.01); *G06T 7/0081* (2013.01); *G06T 7/0083* (2013.01); *G06T 7/0097* (2013.01); *G06T 2207/10024* (2013.01); *G06T 2207/10028* (2013.01)

(58) Field of Classification Search
None
See application file for complete search history.

(56) References Cited

U.S. PATENT DOCUMENTS

| 7,379,583 | B2 | 5/2008 | Zitnick, III et al. | |
|---|---|---|---|---|
| 8,009,871 | B2 * | 8/2011 | Rafii et al. | 382/106 |
| 2010/0080448 | A1 * | 4/2010 | Tam et al. | 382/154 |
| 2011/0150321 | A1 * | 6/2011 | Cheong et al. | 382/154 |
| 2012/0008852 | A1 * | 1/2012 | Niu et al. | 382/154 |
| 2012/0120073 | A1 * | 5/2012 | Haker et al. | 345/420 |
| 2012/0249740 | A1 * | 10/2012 | Lee et al. | 348/46 |
| 2013/0266208 | A1 * | 10/2013 | Lim et al. | 382/154 |
| 2014/0140613 | A1 * | 5/2014 | Jung | 382/164 |
| 2015/0055840 | A1 * | 2/2015 | Xiao et al. | 382/131 |
| 2015/0055841 | A1 * | 2/2015 | Xiao et al. | 382/131 |

FOREIGN PATENT DOCUMENTS

| KR | 10-1025405 | 3/2011 |
|---|---|---|
| KR | 10-2012-0110297 | 10/2012 |
| WO | WO 2012074361 A1 * | 6/2012 |

* cited by examiner

*Primary Examiner* — Sean Motsinger
(74) *Attorney, Agent, or Firm* — Harness, Dickey & Pierce, P.L.C.

(57) ABSTRACT

Provided is an image processing apparatus and method for adjusting a color image using a depth image. The image processing apparatus may include a color image segmenting unit to segment a color image into a plurality of color segments, using a color layer of the color image, a depth image segmenting unit to segment a depth image into a plurality of depth segments, using a depth layer of the depth image, and a layer boundary adjusting unit to adjust a boundary value of the color layer, using the plurality of color segments and the plurality of depth segments.

19 Claims, 11 Drawing Sheets

210

220

230

240

241

610

620

APPARATUS AND METHOD FOR PROCESSING COLOR IMAGE USING DEPTH IMAGE

CROSS-REFERENCE TO RELATED APPLICATIONS

This application claims the priority benefit of Korean Patent Application No. 10-2012-0132917, filed on Nov. 22, 2012, in the Korean Intellectual Property Office, the disclosure of which is incorporated herein by reference.

BACKGROUND

1. Field

One or more example embodiments relate to an apparatus and method for processing a color image, and more particularly, to an apparatus and method for adjusting a color image using a depth image.

2. Description of the Related Art

Image quality enhancement technology has been studied continuously as a main technology of image processing. Conventional image quality enhancement technologies employ a scheme of modifying a histogram of an image.

Depending on a direction or an intensity of light, a boundary between a light area and a shadow area formed by light in a single object may be displayed indistinctly. In this instance, a user may experience difficulty in recognizing the corresponding areas as a single object.

When only a color image is provided, it may be impossible to verify whether the corresponding boundary is a boundary between objects or a boundary generated due to light in an identical object and thus, there may be a limitation to identifying an area to be adjusted.

Accordingly, there is a need for technology for identifying a type of a boundary displayed in an image and adjusting the boundary.

SUMMARY

The foregoing and/or other aspects are achieved by providing an image processing apparatus, including a color image segmenting unit to segment a color image into a plurality of color segments, using a color layer of the color image, a depth image segmenting unit to segment a depth image into a plurality of depth segments, using a depth layer of the depth image, and a layer boundary adjusting unit to adjust a boundary value of the color layer, using the plurality of color segments and the plurality of depth segments.

The layer boundary adjusting unit may adjust the boundary value of the color layer, using an area of a depth segment overlapping a color segment and an area of a color segment overlapping a depth segment.

The layer boundary adjusting unit may adjust the boundary value of the color layer, using the area of the depth segment overlapping the color segment and an area of the color segment. Here, the area of the depth segment overlapping the color segment may correspond to a largest area among areas of the plurality of depth segments overlapping the color segment.

The layer boundary adjusting unit may adjust the boundary value of the color layer, using the area of the color segment overlapping the depth segment and an area of the color segment. Here, the area of the color segment overlapping the depth segment may correspond to a largest area among areas of the plurality of color segments overlapping the depth segment.

The color layer may correspond to a layer in the color image segmented based on lightness information of the color image.

The depth layer may correspond to a layer in the depth image segmented based on depth information of the depth image.

The layer boundary adjusting unit may adjust the boundary value of the color layer for the plurality of color segments to be similar to the plurality of depth segments, using the plurality of color segments and the plurality of depth segments.

The image processing apparatus may further include a color image adjusting unit to adjust the color image, by modifying lightness information of the color image using the adjusted boundary value of the color layer.

The foregoing and/or other aspects are achieved by providing an image processing method, including segmenting a color image into a plurality of color segments, using a color layer of the color image, segmenting a depth image into a plurality of depth segments, using a depth layer of the depth image, and adjusting a boundary value of the color layer, using the plurality of color segments and the plurality of depth segments.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
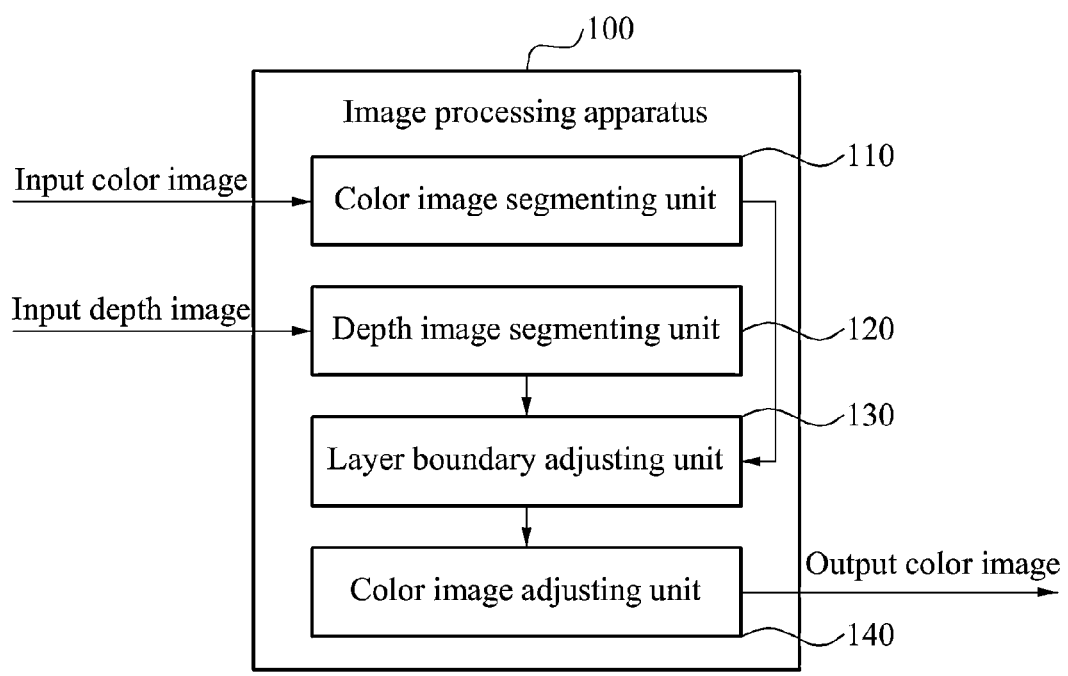
FIG. 1 illustrates a configuration of an image processing apparatus according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a configuration of an image processing apparatus 100 according to example embodiments.

Referring to FIG. 1, the image processing apparatus 100 may include, for example, a color image segmenting unit 110, a depth image segmenting unit 120, a layer boundary adjusting unit 130, and a color image adjusting unit 140.

The color image segmenting unit 110 may segment an input color image into a plurality of color segments, using a color layer. In this instance, the color image segmenting unit 110 may segment the input color image into a plurality of color layers, using lightness information of the input color image.

For example, the color image segmenting unit 110 may segment the input color image into the plurality of color layers, using an intensity (I) component of a red, green, and blue (RGB) color space converted into an HIS model. Here, the HIS model may refer to a color model including hue, intensity, and saturation.

In addition, the color image segmenting unit 110 may segment the input color image into the plurality of color layers, using an L component of an RGB color space converted into a Lab model. Here, the Lab model may include the L component for lightness, along with an a component and a b component indicating a color tone. In this instance, the a component may indicate a color tone within a range from green to red, and the b component may indicate a color tone within a range from blue to yellow.

The lightness information of the input color image may correspond to a lightness histogram of the input color image. For example, the color image segmenting unit 110 may segment the color image into the plurality of color layers, using a local minimum value and a local maximum value of the lightness histogram of the input color image.

In particular, the color image segmenting unit 110 may smooth the lightness histogram by applying a low-pass filter to the lightness histogram, and segment the input color image into the plurality of color layers, based on local values of the smoothed lightness histogram. In addition, the color image segmenting unit 110 may generate a plurality of Gaussian functions by modeling the lightness histogram using a Gaussian mixture, and segment the input color image into the plurality of color layers based on intersecting points of the plurality of Gaussian functions. The color image segmenting unit 110 may generate the plurality of Gaussian functions, by applying an expectation maximization algorithm, and the like. In this instance, a boundary value indicating a boundary of a layer may correspond to an intersecting point of Gaussian functions or a local value of a lightness histogram corresponding to a criterion for segmenting a color image into color layers.

In addition, the color image segmenting unit 110 may segment pixels having lightness information corresponding to a value between one boundary value and another boundary value of layers, as a single color segment. For example, when a boundary value between a first layer and a second layer corresponds to 50 and a boundary value between the second layer and a third layer corresponds to 100, the color image segmenting unit 110 may classify pixels having lightness information corresponding to a value between 50 and 100, as a single color segment.

The depth image segmenting unit 120 may segment an input depth image into a plurality of depth segments, using a depth layer. In this instance, the input depth image may correspond to an image processed using a predetermined technique or an image received from a depth camera. For example, the input depth image may correspond to an image acquired using stereo matching. In addition, the input depth image may have a resolution identical to a resolution of the input color image, and may be registered.

The depth image segmenting unit 120 may segment the input depth image into a plurality of depth layers, using depth information of the input depth image. In addition, the depth information of the input depth image may correspond to a depth histogram of the input depth image.

In an embodiment, the depth image segmenting unit 120 may smooth the depth histogram by applying a low-pass filter to the depth histogram, and may segment the input depth image into the plurality of depth layers, based on local values of the smoothed depth histogram. In addition, the depth image segmenting unit 120 may generate a plurality of Gaussian functions by modeling the depth histogram using a Gaussian mixture, and may segment the input depth image into the plurality of depth layers based on intersecting points of the plurality of Gaussian functions. The depth image segmenting unit 120 may generate the plurality of Gaussian functions, by applying an expectation maximization algorithm, and the like. Further, a boundary value indicating a boundary of a layer may correspond to an intersecting point of Gaussian functions or a local value of a depth histogram corresponding to a criterion for segmenting a depth image into depth layers.

In addition, the depth image segmenting unit 120 may classify pixels having depth information corresponding to a value between one boundary value and another boundary value of layers, as a single depth segment. For example, when a boundary value between a first layer and a second layer corresponds to 50 and a boundary value between the second layer and a third layer corresponds to 100, the depth image segmenting unit 120 may classify pixels having depth information corresponding to a value between 50 and 100, as a single depth segment.

The layer boundary adjusting unit 130 may adjust a boundary value of a color layer, using the plurality of color segments segmented by the color image segmenting unit 110 and the plurality of depth segments segmented by the depth image segmenting unit 120.

In an embodiment, the layer boundary adjusting unit 130 may adjust the boundary value of the color layer, using an area of a first depth segment overlapping a first color segment and an area of a second color segment overlapping a second depth segment. In first embodiment, the first color segment and the second color segment may be different, while in another embodiment the first color segment and the second color segment may be identical. In another embodiment the first depth segment and the second depth segment may be different while in still another embodiment the first depth segment and the second depth segment may be different.

For example, the layer boundary adjusting unit 130 may adjust the boundary value of the color layer, using an optimization function, thereby maximizing an overlap between a color segment and a depth segment while minimizing a change in a layer boundary. Here, the optimization function may be expressed by Equation 1.

$$l_1^*, \ldots, l_N^* = \underset{l_1 \leftrightarrow l_N}{\operatorname{argmin}} \left\{ \sum_{i=1}^{N} (l_i^o - l_i)^2 + \lambda R(S_l, S_d) \right\} \quad [\text{Equation 1}]$$

In Equation 1, $l_i^o$ denotes a boundary value of an $i^{th}$ layer of the color image segmented by the color image segmenting unit 110, and N denotes a number of color layers segmented by the color image segmenting unit 110. In addition, $S_l$ and $S_d$ denote a color segment and a depth segment, respectively. $l_i$ denotes a value minimizing $l^*_N$, among values of the $i^{th}$ layer.

R denotes a function to measure an overlap between a color segment and a depth segment, based on a boundary value of a color layer and a boundary value of a depth layer, and $\lambda$ denotes a variable adjusting a weight of R. For example, R may be expressed by Equation 2 or Equation 3.

$$R(S_l, S_d) = \quad \text{[Equation 2]}$$

$$\left\{ \frac{\text{size}(S_i)}{\sum_{i=1}^{N} \max_{k} (\text{size}(S_i \cap S_k))} \right\} + \left\{ \frac{\text{size}(S_i)}{\sum_{k=1}^{M} \max_{i} (\text{size}(S_i \cap S_k))} \right\}$$

$$R(S_l, S_d) = \quad \text{[Equation 3]}$$

$$\sum_{i=1}^{N} \max_{k} \left\{ \frac{\text{size}(S_i \cap S_k)}{\text{size}(S_i)} \right\} + \sum_{k=1}^{M} \max_{ki} \left\{ \frac{\text{size}(S_i \cap S_k)}{\text{size}(S_i)} \right\}$$

In this instance, $S_i$ denotes an $i^{th}$ color segment, $S_k$ denotes a $k^{th}$ depth segment, and M denotes a number of depth layers segmented by the depth image segmenting unit 120. In addition, size($S_i \cap S_k$) denotes an overlapping area of the $i^{th}$ color segment and the $k^{th}$ depth segment.

The layer boundary adjusting unit 130 may adjust the boundary value of the color layer, using an area of a first depth segment overlapping a first color segment, an area of a second color segment overlapping a second depth segment, and an area of the color segment. The area of the depth segment overlapping the color segment may correspond to a largest area among areas of depth segments overlapping the color segment. In addition, the area of the color segment overlapping the depth segment may correspond to a largest area among areas of color segments overlapping the depth segment.

The color image adjusting unit 140 may modify lightness information of the input color image, using the boundary value of the color layer adjusted by the layer boundary adjusting unit 130, and adjust the input color image based on the modified lightness information of the input color image, thereby generating an output color image.

For example, the color image adjusting unit 140 may perform histogram stretching for each color layer, based on the adjusted boundary value of the color layer. In addition, when the color image segmenting unit 110 segments the input color image into a plurality of color layers using the Gaussian mixture, the color image adjusting unit 140 may modify a color histogram, by adjusting variances and means of respective Gaussian functions.

The color image adjusting unit 140 may generate a mapping function to enable the output color image to have the modified color histogram.

The color image adjusting unit 140 may apply the mapping function to the input color image, thereby generating a quality-enhanced output color image.

FIGS. 2A through 2D illustrate an example of segmenting an input color image and an input depth image according to example embodiments.

Figure 2A:
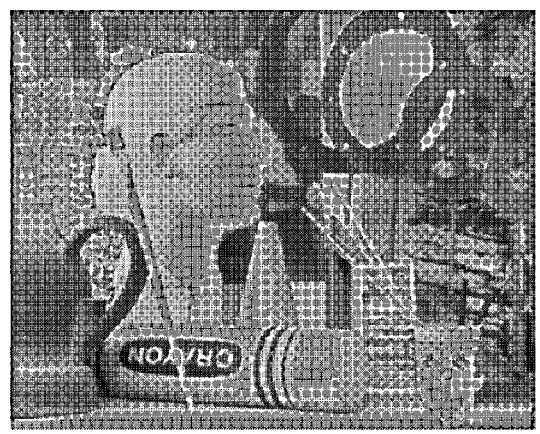
FIGS. 2A through 2D illustrate an example of segmenting an input color image and an input depth image according to example embodiments.

The color image segmenting unit 110 may segment an input color image 210 of FIG. 2A into a plurality of color segments, using a color layer of the input color image 210. In this instance, the color layer may correspond to a layer in the color image 210 segmented based on lightness information of the color image 210.

Figure 2B:
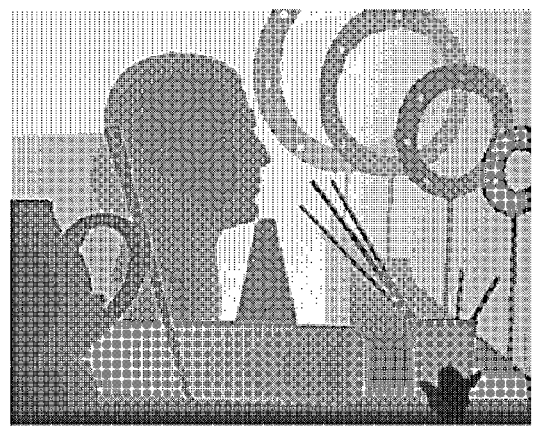
Figure 2C:
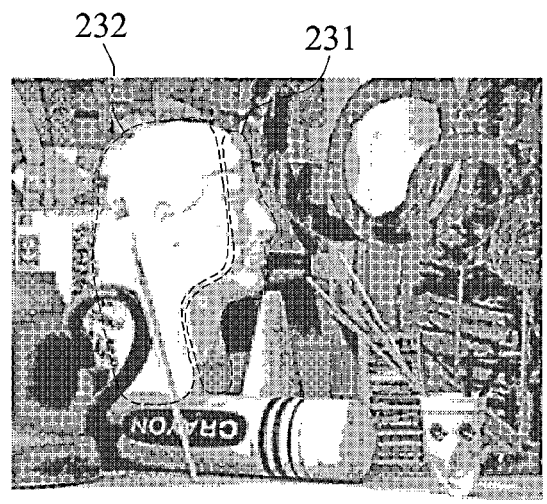

Accordingly, a segmented input color image 230 of FIG. 2C may include color segments corresponding to the lightness information of the color image 210.

For example, when a scene in which light enters from a left side is captured, as shown in FIG. 2A, a left side of the input color image 210 may be lighter than a right side of the input color image 210. Accordingly, when the input color image 210 is segmented into color segments based on light information of the color image 210, a statue may be segmented into a color segment 232 corresponding to a light portion, and a color segment 231 corresponding to a dark portion due to shadow, as shown in FIG. 2C.

The depth image segmenting unit 120 may segment an input depth image 220 of FIG. 2B into a plurality of depth segments, using a depth layer of the input depth image 220. In this instance, the depth layer may correspond to a layer in the depth image 220 segmented based on depth information of the depth image 220.

Figure 2D:
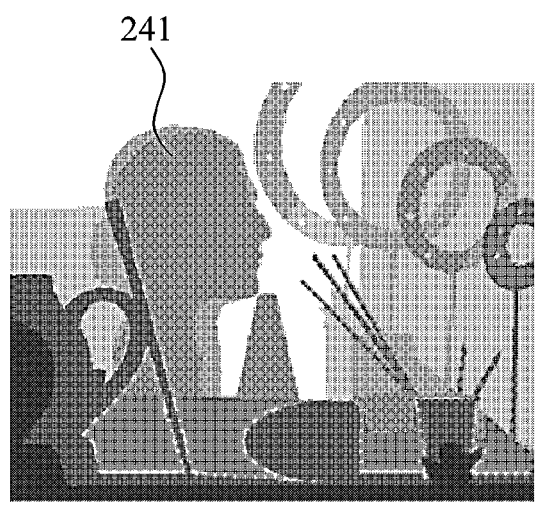

Accordingly, a segmented input depth image 240 of FIG. 2D may include depth segments corresponding to the depth information of the depth image 220. For example, an object disposed at a location identical to a location of the statue may be segmented as a single depth segment 241, as shown in FIG. 2D.

Figure 3:
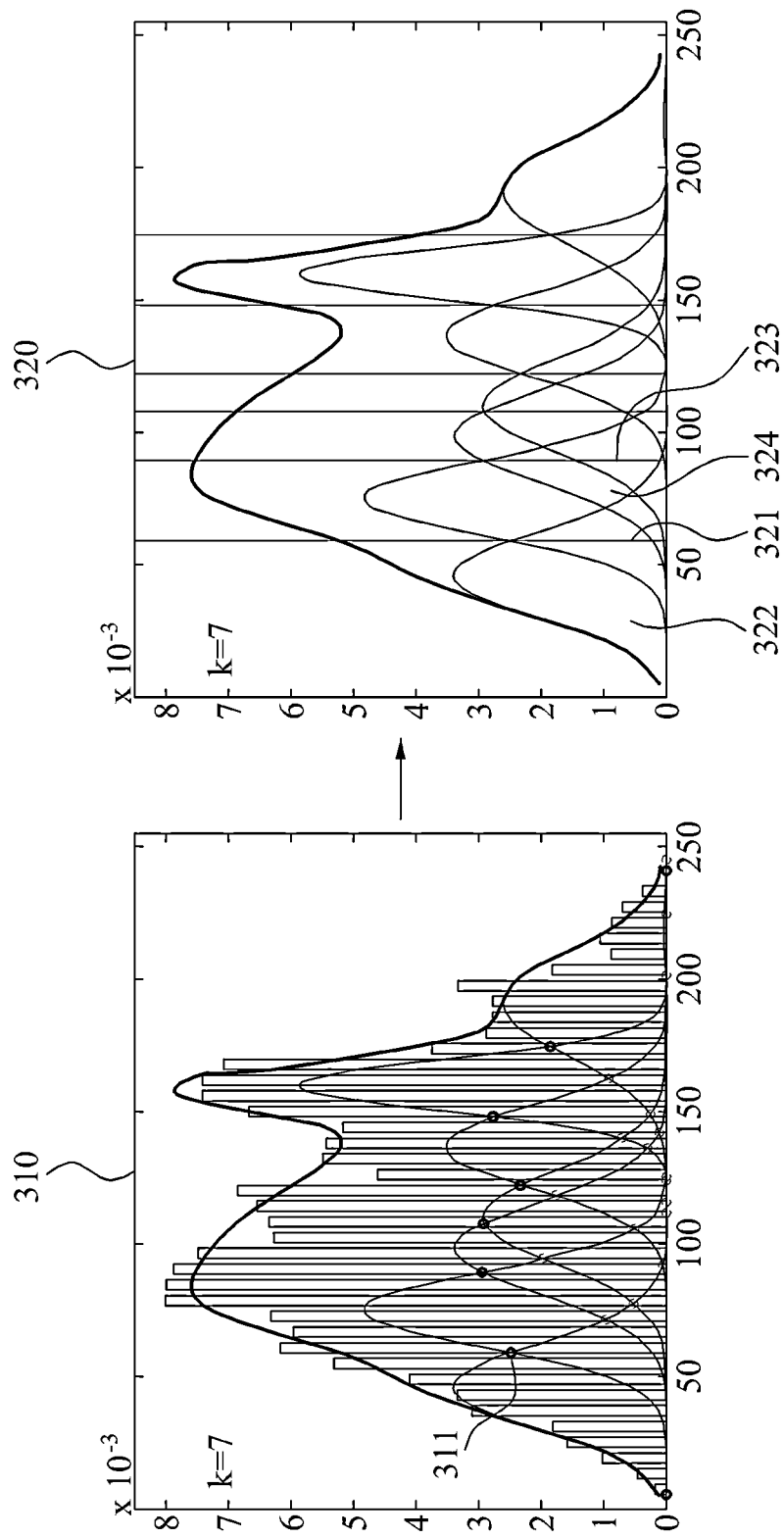
FIG. 3 illustrates an example of a process of segmenting an image into layers according to example embodiments.

FIG. 3 illustrates an example of a process of segmenting an image into layers according to example embodiments.

Referring to FIG. 3, in operation 310, the color image segmenting unit 110 may generate a plurality of Gaussian functions by modeling a lightness histogram using a Gaussian mixture, and identify intersecting points 311 of the Gaussian functions.

In operation 320, the color image segmenting unit 110 may segment an input color image into a plurality of color layers, based on the intersecting points 311 identified in operation 310.

In particular, the color image segmenting unit 110 may set an intersecting point having a value closest to "0" to be a first boundary value 321.

The color image segmenting unit 110 may segment lightness values between "0" and the first boundary value 321, as a first color layer 322.

The color image segmenting unit 110 may set an intersecting point having a value closest to the first boundary value 321 to be a second boundary value 323.

The color image segmenting unit 110 may segment lightness values between the first boundary value 321 and the second boundary value 323, as a second color layer 324.

The color image segmenting unit 110 may iteratively perform the above process to a maximum lightness value, thereby segmenting the input color image into the plurality of color layers.

Figure 4:
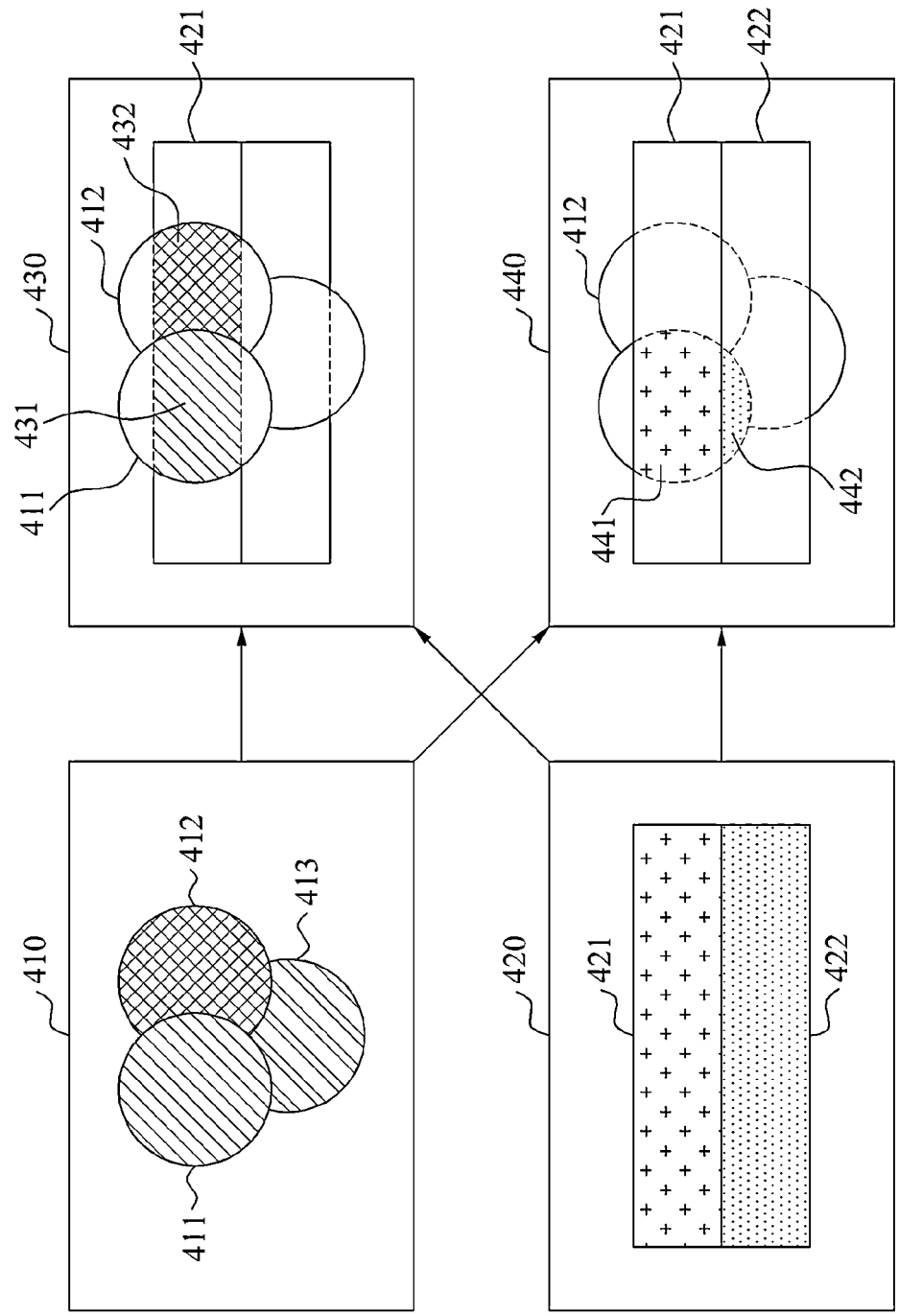
FIG. 4 illustrates an example of using color segments and depth segments for adjusting a boundary value of a layer according to example embodiments.

FIG. 4 illustrates an example of using color segments and depth segments for adjusting a boundary value of a layer according to example embodiments.

Referring to FIG. 4, a color image 410 segmented by the color image segmenting unit 110 may include a first color segment 411, a second color segment 412, and a third color segment 413. In addition, a depth image 420 segmented by the depth image segmenting unit 120 may include a first depth segment 421, and a second depth segment 422.

The layer boundary adjusting unit 130 may measure areas of color segments overlapping depth segments, as shown in an image 430 of FIG. 4. Furthermore, the first color segment 411 and the second color segment 412 may overlap the first depth segment 421.

The layer boundary adjusting unit 130 may compare an area 431 of the first color segment 411 overlapping the first depth segment 421 to an area 432 of the second color segment 412 overlapping the first depth segment 421.

As shown in FIG. 4, when the area 431 is greater than the area 432, the layer boundary adjusting unit 130 may add a value obtained by dividing an area of the first color segment 411 by the area 431 to a boundary value of a color layer.

In addition, the layer boundary adjusting unit 130 may measure areas of depth segments overlapping color segments, as shown in an image 440 of FIG. 4. Moreover, the first depth segment 421 and the second depth segment 422 may overlap the first color segment 411.

The layer boundary adjusting unit 130 may compare an area 441 of the first depth segment 421 overlapping the first color segment 411 to an area 442 of the second depth segment 422 overlapping the first color segment 411.

As shown in FIG. 4, when the area 441 is greater than the area 442, the layer boundary adjusting unit 130 may add a value obtained by dividing an area of the first color segment 411 by the area 441 to the boundary value of the color layer.

The layer boundary adjusting unit 130 may add a sum of the value obtained by dividing the area of the first color segment 411 by the area 431 and the value obtained by dividing the first color segment 411 by the area 441 to the boundary value of the color layer.

Figure 5:
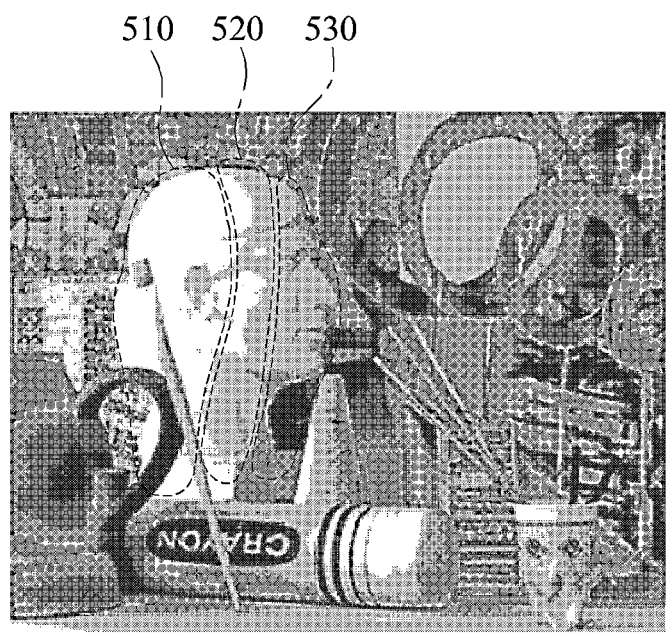
FIG. 5 illustrates an example of a color segment in which a boundary value of a layer is adjusted according to example embodiments.

FIG. 5 illustrates an example of a color segment in which a boundary value of a layer is adjusted according to example embodiments.

The layer boundary adjusting unit 130 may adjust a boundary value of a color layer for color segments to be similar to depth segments, using the color segments segmented by the color image segmenting unit 110 and the depth segments segmented by the depth image segmenting unit 120.

For example, referring to FIG. 2A through 2D, a difference between lightness information of the color segment 232 and lightness information of the color segment 231 is substantial. Accordingly, although the color segment 231 and the color segment 232 are segments of an identical object, a boundary between the color segment 231 and the color segment 232 may be displayed distinctly. In this instance, a user may recognize the color segment 231 and the color segment 232 as separate objects.

Accordingly, the layer boundary adjusting unit 130 may adjust a boundary value of a color layer corresponding to the boundary between the color segment 231 and the color segment 232, thereby preventing the boundary between the segments of the identical object from being distinct.

For example, the color segment 231 and the color segment 232 may overlap the depth segment 241, and an area of the color segment 232 overlapping the depth segment 241 may be greater than an area of the color segment 231 overlapping the depth segment 241.

Accordingly, the layer boundary adjusting unit 130 may adjust the boundary value of the color layer in a direction of the color segment 232.

In this instance, the statue may be segmented into a first color segment 510, a second color segment 520, and a third color segment 530, based on the adjusted boundary value of the color layer, as shown in FIG. 5.

The first color segment 510 may correspond to the color segment 232, and the third color segment 530 may correspond to the color segment 231. In addition, the second segment 520 may have a lightness value between a lightness value of the first color segment 510 and a lightness value of the third color segment 530.

In particular, the layer boundary adjusting unit 130 may add a color segment having an intermediate lightness value by adjusting the boundary value of the color layer, thereby preventing a user from recognizing a single object as two areas when a boundary of segments are displayed distinctly.

Figure 6A:
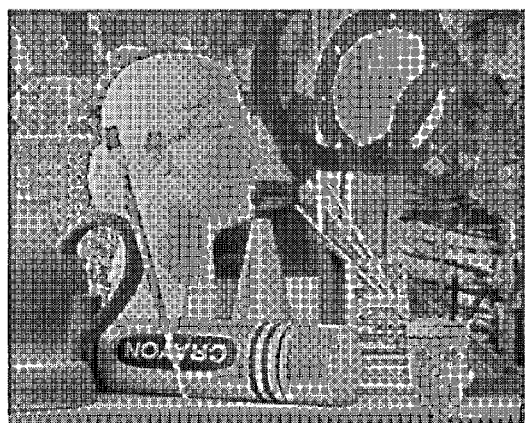
FIGS. 6A and 6B illustrate an input color image and an output color image according to example embodiments.
Figure 6B:
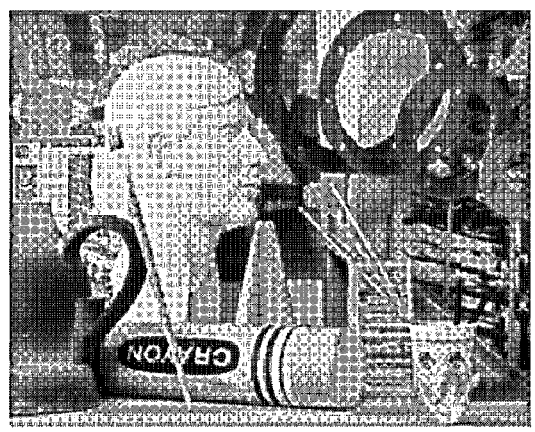

FIGS. 6A and 6B illustrate an input color image and an output color image according to example embodiments.

As shown in FIGS. 6A and 6B, the image processing apparatus 100 may adjust an input color image 610 of FIG. 6A to generate an output color image 620 of FIG. 6B.

In the input color image 610, there is a substantial difference between a lightness of a left side of a statue corresponding to a direction of a light source and a lightness of a right side of the statue on which shadow is formed by the light source. Accordingly, a boundary at which the lightness is changed may be displayed distinctly.

In contrast, in the output color image 620, the lightness at the boundary portion may be adjusted such that a boundary generated by a sudden change in the lightness value of the statue may not be displayed.

In particular, the image processing apparatus 100 may adaptively apply quality enhancement to a portion in which a depth is changed in the input color image 610, thereby outputting the visibility-enhanced output color image 620.

Figure 7:
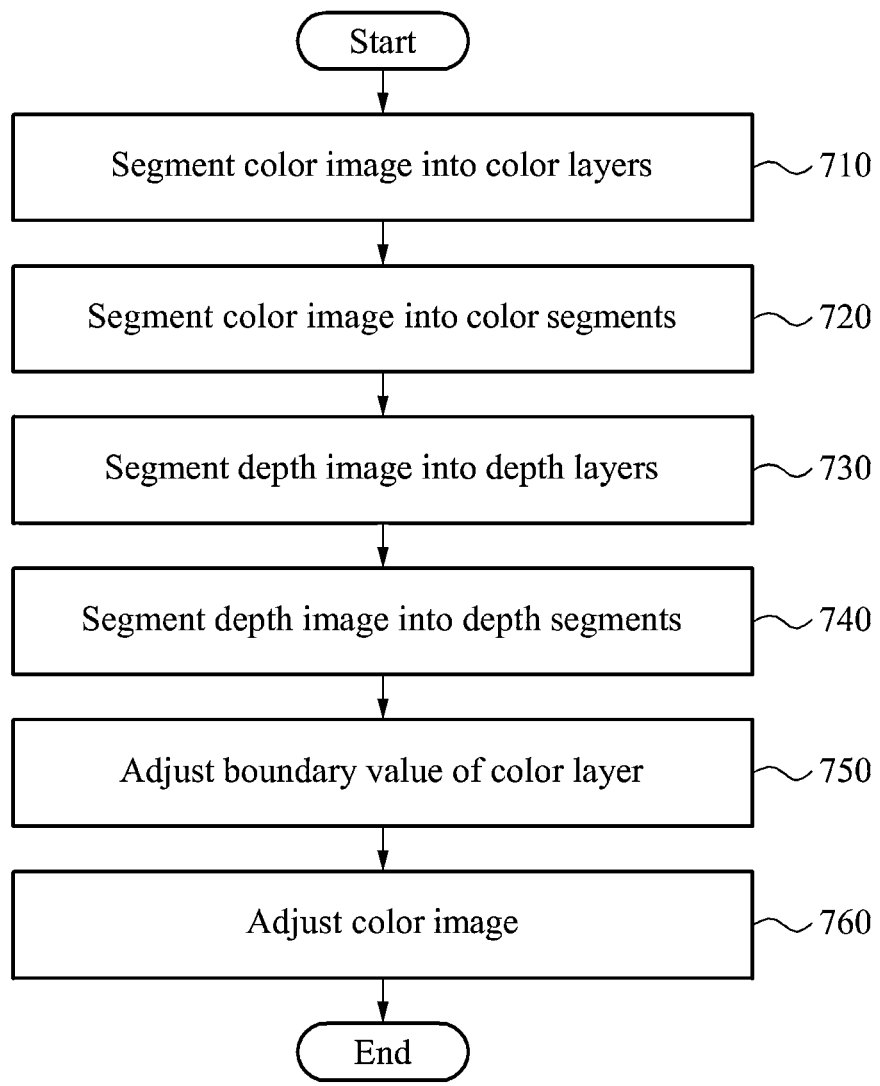
FIG. 7 illustrates an image processing method according to example embodiments.

FIG. 7 illustrates an image processing method according to example embodiments.

Referring to FIG. 7, in operation 710, the color image segmenting unit 110 may segment an input color image into a plurality of color layers, using lightness information of the input color image.

For example, the color image segmenting unit 110 may segment the input color image into the plurality of color layers, using an I component of an RGB color space converted into an HIS model. In addition, the color image separating unit 110 may segment the input color image into the plurality of color layers, using an L component of an RGB color space converted into a Lab model. The color image segmenting unit 110 may segment the color image into the plurality of color layers, using a local minimum value and a local maximum value of a lightness histogram of the input color image.

In operation 720, the color image segmenting unit 110 may segment the input color image into a plurality of color segments, using the plurality of color layers segmented in operation 710. In this instance, the color image segmenting unit 110 may classify pixels having lightness information corresponding to a value between one boundary value and another boundary value of layers, as a single color segment. For example, when a boundary value between a first layer and a second layer corresponds to 50 and a boundary value between the second layer and a third layer corresponds to 100, the color image segmenting unit 110 may classify pixels having lightness information corresponding to a value between 50 and 100, as a single color segment.

In operation 730, the depth image segmenting unit 120 may segment an input depth image into a plurality of layers, using depth information of the input depth image.

In this instance, the depth image segmenting unit 120 may smooth a depth histogram by applying a low-pass filter to the depth histogram, and may segment the input depth image into the plurality of depth layers, based on local values of the smoothed depth histogram. In addition, the depth image segmenting unit 120 may generate a plurality of Gaussian functions by modeling the depth histogram using a Gaussian mixture, and may segment the input depth image into the plurality of depth layers based on intersecting points of the plurality of Gaussian functions. The depth image segmenting unit 120 may generate the plurality of Gaussian functions, by applying an expectation maximization algorithm, and the like.

In operation 740, the depth image segmenting unit 120 may segment the depth image into a plurality of depth segments, using the depth layers segmented in operation 730.

In addition, the depth image segmenting unit 120 may classify pixels having depth information corresponding to a value between one boundary value and another boundary value of layers, as a single depth segment. For example, when a boundary value between a first layer and a second layer corresponds to 50 and a boundary value between the second layer and a third layer corresponds to 100, the depth image segmenting unit 120 may classify pixels having depth information corresponding to a value between 50 and 100, as a single depth segment.

In operation 750, the layer boundary adjusting unit 130 may adjust a boundary value of a color layer, using the plurality of color segments segmented in operation 720 and the plurality of depth segments segmented in operation 740. Moreover, the layer boundary adjusting unit 130 may adjust the boundary value of the color layer, using an area of a first depth segment overlapping a first color segment, and an area of a second color segment overlapping a second depth segment.

Furthermore, the layer boundary adjusting unit 130 may adjust the boundary value of the color layer, using an area of a first depth segment overlapping a first color segment, an area of a second color segment overlapping a second depth segment, and an area of the color segment. In this instance, the area of the first depth segment overlapping the first color segment may correspond to a largest area among areas of depth segments overlapping the first color segment. In addition, the area of the second color segment overlapping the second depth segment may correspond to a largest area among areas of color segments overlapping the second depth segment.

In operation 760, the color image adjusting unit 140 may modify lightness information of the input color image, using the boundary value of the color layer adjusted in operation 750, and adjust the input color image based on the modified lightness information of the input color image, thereby generating an output color image.

For example, the color image adjusting unit 140 may perform histogram stretching for each color layer, based on the adjusted boundary value of the color layer. In addition, when the color image segmenting unit 110 segments the input color image into a plurality of color layers using the Gaussian mixture, the color image adjusting unit 140 may modify a color histogram, by adjusting variances and means of respective Gaussian functions.

The color image adjusting unit 140 may generate a mapping function to enable the output color image to have the modified color histogram.

The color image adjusting unit 140 may apply the mapping function to the input color image, thereby generating a quality-enhanced output color image.

In addition, the sequence of performing the operations 710 through 740 may be changed. For example, the method may be performed in an order of operation 730, operation 740, operation 710, and operation 720.

In addition, a subject performing the operations 710 and 720 may be different from a subject performing the operations 730 and 740 and thus, the operations may be performed in parallel by the respective subjects. For example, the operation 710 and the operation 720 may be performed simultaneously by the color image segmenting unit 110 and the depth image segmenting unit 120, respectively, and the operation 730 and the operation 740 may be performed simultaneously by the color image segmenting unit 110 and the depth image segmenting unit 120, respectively.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a controller such as a dedicated processor unique to that unit or by a processor common to one or more of the modules. The described methods may be executed on a general purpose computer or processor or may be executed on a particular machine such as the image processing apparatus described herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing apparatus, comprising:
    a processor to control one or more processor-executable units;
    a color image segmenting unit to segment a color image into a plurality of color segments, using a color layer of the color image;
    a depth image segmenting unit to segment a depth image into a plurality of depth segments, using a depth layer of the depth image; and
    a layer boundary adjusting unit to adjust a boundary value of the color layer, using the plurality of color segments and the plurality of depth segments.

2. The apparatus of claim 1, wherein the layer boundary adjusting unit adjusts the boundary value of the color layer using an area of a first depth segment overlapping a first color segment and an area of a second color segment overlapping a second depth segment.

3. The apparatus of claim 2, wherein the layer boundary adjusting unit adjusts the boundary value of the color layer using the area of the first depth segment overlapping the first color segment and an area of the color segment,
    wherein, the area of the first depth segment overlapping the first color segment corresponds to a largest area among areas of a plurality of depth segments overlapping the color segment.

4. The apparatus of claim 2, wherein the layer boundary adjusting unit adjusts the boundary value of the color layer, using the area of the second color segment overlapping the second depth segment and an area of the color segment,
    wherein, the area of the second color segment overlapping the second depth segment corresponds to a largest area among areas of a plurality of color segments overlapping the depth segment.

5. The apparatus of claim 1, wherein the color layer corresponds to a layer in the color image segmented based on lightness information of the color image.

6. The apparatus of claim 1, wherein the depth layer corresponds to a layer in the depth image segmented based on depth information of the depth image.

7. The apparatus of claim 1, wherein the layer boundary adjusting unit adjusts the boundary value of the color layer for the plurality of color segments to be similar to the plurality of depth segments, using the plurality of color segments and the plurality of depth segments.

8. The apparatus of claim 1, further comprising:
a color image adjusting unit to adjust the color image, by modifying lightness information of the color image using the adjusted boundary value of the color layer.

9. An image processing method, comprising:
segmenting, by way of a processor, a color image into a plurality of color segments, using a color layer of the color image;
segmenting a depth image into a plurality of depth segments, using a depth layer of the depth image; and
adjusting a boundary value of the color layer, using the plurality of color segments and the plurality of depth segments.

10. The method of claim 9, wherein the adjusting comprises adjusting the boundary value of the color layer, using an area of a first depth segment overlapping a first color segment and an area of a second color segment overlapping a second depth segment.

11. The method of claim 10, wherein the adjusting further comprises adjusting the boundary value of the color layer, using the area of the first depth segment overlapping the first color segment and an area of the color segment,
wherein, the area of the first depth segment overlapping the first color segment corresponds to a largest area among areas of a plurality of depth segments overlapping the color segment.

12. The method of claim 10, wherein the adjusting further comprises adjusting the boundary value of the color layer, using the area of the second color segment overlapping the second depth segment and an area of the color segment,
wherein, the area of the color segment overlapping the depth segment corresponds to a largest area among areas of the plurality of color segments overlapping the depth segment.

13. The method of claim 9, wherein the color layer corresponds to a layer in the color image segmented based on lightness information of the color image.

14. The method of claim 9, wherein the depth layer corresponds to a layer in the depth image segmented based on depth information of the depth image.

15. The method of claim 9, wherein the adjusting comprises adjusting the boundary value of the color layer for the plurality of color segments to be similar to the plurality of depth segments, using the plurality of color segments and the plurality of depth segments.

16. The method of claim 9, further comprising:
adjusting the color image, by modifying lightness information of the color image using the adjusted boundary value of the color layer.

17. A non-transitory computer-readable medium comprising a program for instructing a computer to perform the method of claim 9.

18. The apparatus of claim 2, wherein the layer boundary adjusting unit adjusts the boundary value of the color layer by maximizing an overlap between a color segment and a depth segment while minimizing a change in a layer boundary.

19. The method of claim 10, wherein the adjusting further comprises adjusting the boundary value of the color layer by maximizing an overlap between a color segment and a depth segment while minimizing a change in a layer boundary.

* * * * *